(12) United States Patent
Zhang et al.

(10) Patent No.: US 11,537,535 B2
(45) Date of Patent: Dec. 27, 2022

(54) NON-VOLATILE MEMORY BASED PROCESSORS AND DATAFLOW TECHNIQUES

(71) Applicant: MemryX Inc., Ann Arbor, MI (US)

(72) Inventors: Zhengya Zhang, Ann Arbor, MI (US); Mohammed Zidan, Ann Arbor, MI (US); Fan-hsuan Meng, Ann Arbor, MI (US); Chester Liu, Ann Arbor, MI (US); Jacob Botimer, Ann Arbor, MI (US); Timothy Wesley, Ann Arbor, MI (US); Wei Lu, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 120 days.

(21) Appl. No.: 16/894,588

(22) Filed: Jun. 5, 2020

(65) Prior Publication Data
US 2021/0011863 A1    Jan. 14, 2021

Related U.S. Application Data

(60) Provisional application No. 62/872,147, filed on Jul. 9, 2019.

(51) Int. Cl.
| | | |
|---|---|---|
| G06F 13/16 | (2006.01) | |
| G06F 12/02 | (2006.01) | |
| G06F 7/544 | (2006.01) | |
| G06F 9/30 | (2018.01) | |
| G06F 9/38 | (2018.01) | |

(Continued)

(52) U.S. Cl.
CPC ........ *G06F 13/1668* (2013.01); *G06F 7/5443* (2013.01); *G06F 9/30032* (2013.01); *G06F 9/3824* (2013.01); *G06F 9/3893* (2013.01); *G06F 9/544* (2013.01); *G06F 12/0246* (2013.01); *G06F 17/16* (2013.01); *G06V 10/758* (2022.01); *G06F 2212/7207* (2013.01)

(58) Field of Classification Search
CPC ............... G06F 13/1668; G06F 7/5443; G06F 9/30032; G06F 9/3824; G06F 9/3893; G06F 9/544; G06F 12/0246; G06F 17/16; G06F 2212/7207; G06K 9/6212
See application file for complete search history.

(56) References Cited

U.S. PATENT DOCUMENTS

| | | | |
|---|---|---|---|
| 8,867,289 B2 | 10/2014 | Wu et al. | |
| 10,410,098 B2 * | 9/2019 | Nealis | G06F 9/3001 |

(Continued)

FOREIGN PATENT DOCUMENTS

| | | |
|---|---|---|
| CN | 106250103 | 12/2016 |
| KR | 101475645 | 12/2014 |

*Primary Examiner* — Idriss N Alrobaye
*Assistant Examiner* — Richard B Franklin

(57) ABSTRACT

A monolithic integrated circuit (IC) including one or more compute circuitry, one or more non-volatile memory circuits, one or more communication channels and one or more communication interface. The one or more communication channels can communicatively couple the one or more compute circuitry, the one or more non-volatile memory circuits and the one or more communication interface together. The one or more communication interfaces can communicatively couple one or more circuits of the monolithic integrated circuit to one or more circuits external to the monolithic integrated circuit.

20 Claims, 5 Drawing Sheets

(51) Int. Cl.
    *G06F 9/54*           (2006.01)
    *G06F 17/16*         (2006.01)
    *G06V 10/75*       (2022.01)

(56) References Cited

U.S. PATENT DOCUMENTS

| | | |
|---|---|---|
| 2003/0065984 A1 | 4/2003 | Takeda et al. |
| 2006/0119384 A1 | 6/2006 | Camarota et al. |
| 2010/0174848 A1 | 7/2010 | Hana et al. |
| 2017/0357894 A1 | 12/2017 | Bainville et al. |
| 2018/0107921 A1 | 4/2018 | Ross et al. |
| 2018/0129893 A1 | 5/2018 | Son et al. |
| 2019/0026078 A1 | 1/2019 | Bannon et al. |
| 2019/0056885 A1* | 2/2019 | Mathuriya .......... G06F 12/0897 |
| 2019/0103162 A1* | 4/2019 | Asnaashari .............. G11C 7/18 |

\* cited by examiner

NON-VOLATILE MEMORY BASED PROCESSORS AND DATAFLOW TECHNIQUES

CROSS-REFERENCE TO RELATED APPLICATIONS

This application claims the benefit of U.S. Provisional Patent Application No. 62/872,147 filed Jul. 9, 2019, which is incorporated herein in its entirety.

BACKGROUND OF THE INVENTION

Referring to FIG. 1, a computing system according to the conventional art is shown. The compute system 100 can include a processor 110 and off-chip memory 120. The processor 110 can be a monolithic integrated circuit (IC) including one or more compute circuitry 130 and one or more volatile memory circuitry 140. One or more communication channels can couple the one or more compute circuitry 130 to the one or more volatile memory circuitry 140. The monolithic IC processor 110 can also include one or more communication interfaces 160 to couple the one or more volatile memory circuitry 140 to the off-chip memory 120.

In one implementation, the one or more volatile memory circuitry 140 can be static random-access memory (SRAM) commonly referred to in the conventional art as on-chip processor cache. In applications such as artificial intelligence, machine learning, neural networks and the like, the on-chip volatile memory circuitry 140 caches only a portion of weights, kernel functions or the like. Instead, the weights, kernel functions or the like are stored in the off-chip memory 120. Portions of the weights, kernel functions or the like are read in from the off-chip memory 120 to the volatile memory circuitry 140 that are currently being processed by the compute circuitry 130. The results of computations by the compute circuitry 130 are then written out to the off-chip memory 120. Reading and writing data such as weights, kernel functions or the like to the off-chip memory 120 consumes a lot of communication bandwidth between the volatile memory circuitry 140 and the off-chip memory. In addition, the transfer of data such as weights, kernel functions or the like between the volatile memory circuitry 140 and off-chip memory accounts for a substantial portion of power consumption by the compute system 100, and the transfer can cost a long latency. In addition, the volatile memory circuitry 140 consumes power even when data is not being written into and read from the volatile memory circuitry 140.

Accordingly, there is a continuing need for reducing bandwidth utilization between the monolithic IC processor 110 and off-chip memory 120. Likewise, there is a continuing need for reducing power consumption by the monolithic IC processor 110 and off-chip memory 120 in the compute system 100.

SUMMARY OF THE INVENTION

The present technology may best be understood by referring to the following description and accompanying drawings that are used to illustrate embodiments of the present technology directed toward non-volatile memory based processors and dataflow techniques therein.

In one embodiment, a processor can include a plurality of processing elements on a monolithic integrated circuit. Each processing element can include one or more processing circuitry and one or more non-volatile memory circuitry. The compute circuitry of respective processing elements are configurable to perform one or more respective computations or portions of a computation. The non-volatile memory circuitry of respective processing elements are configurable to store a respective set of weights, kernel functions or the like. The plurality of processing elements are configurable to pass data between processing elements.

In another embodiment, a processor configuration method can include receiving a compute model including a plurality of nodes, edges coupling various ones of the plurality of nodes together, and weights of respective nodes. Compute circuitry of a plurality of processing elements can be configured based on respective ones of the plurality of nodes. In addition, data flow between the configured processing elements can be configured based on the edges. Furthermore, the weights of respective nodes can be loaded into non-volatile memory circuitry of respective processing elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
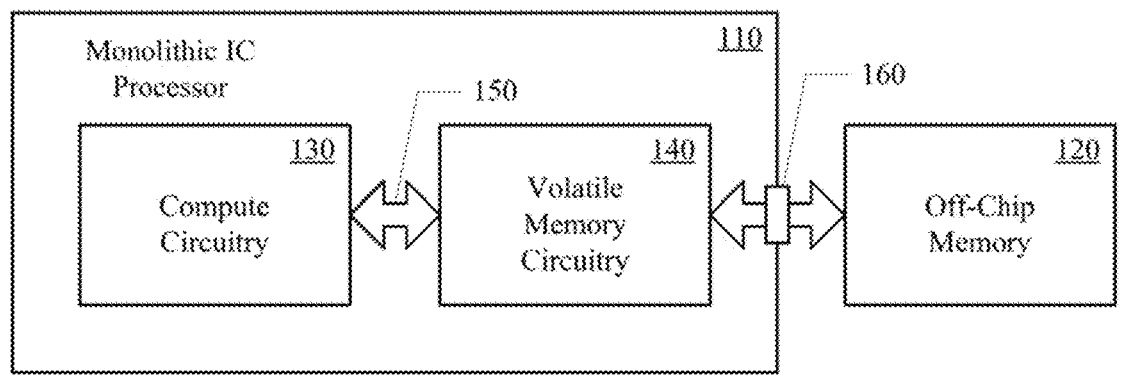
FIG. 1 shows a computing system, according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises" "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
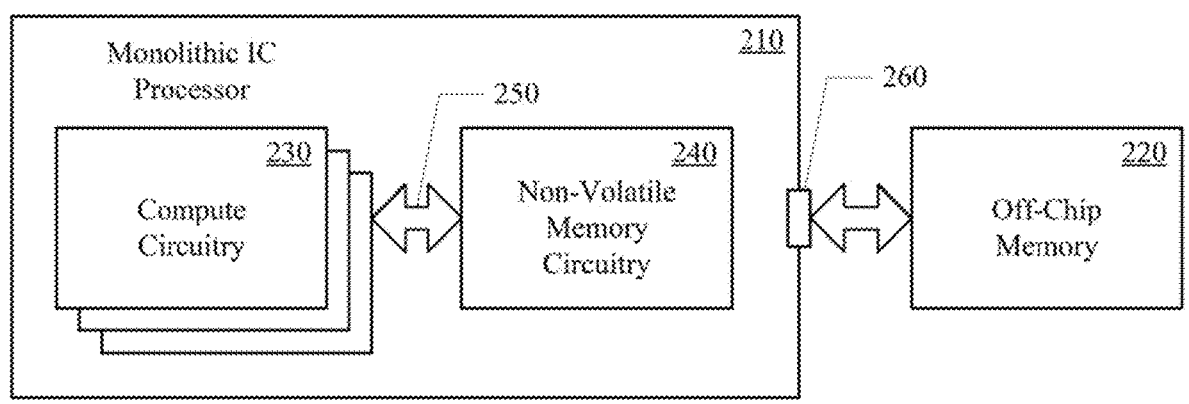
FIG. 2 shows a compute system, in accordance with aspects of the present technology.

Referring to FIG. 2, a compute system, in accordance with aspects of the present technology. The compute system 200 can include one or more processors 210 coupled to one or more off-chip memories 220. The one or more processor 210 can include, but is not limited to, one or more central processing units (CPU), one or more graphics processing units (GPU), one or more tensor processing units (TPU), one or more artificial intelligence (AI) accelerators, or one or more memory processing units. The processor 210 can be a monolithic integrated circuit (IC) including one or more compute circuitry 230, one or more non-volatile memory circuitry 240, one or more communication channels 250 and one or more communication interfaces 260. In an exemplary implementation, the one or more non-volatile memory circuitry 240 can be on-chip non-volatile processor cache of the one or more processors 210. The one or more non-volatile memory circuitry 240 can include, but is not limited to, one or more of as resistive random-access memory (ReRAM), magnetic random-access memory (MRAM), Flash memory (FLASH), or phase change random access memory (PCRAM). The one or more communication channels 250 can communicatively couple the one or more compute circuitry 230 to the one or more non-volatile memory circuitry 240.

The one or more communication interfaces 260 can provide the interface for one or more communication channels between the one or more non-volatile memory circuitry 240 and the one or more off-chip memory 220. The one or more off-chip memory 220 can be one or more monolithic integrated circuit memory that are separate and external (e.g., off-chip) to the monolithic integrated circuit (IC) of the one or more processors 210. The one or more processors 210 can include one or more various other circuits that are not germane to an understanding of aspects of the present technology, and therefore are not discussed further herein. Similarly, the compute system 200 can include one or more various other circuits that are not germane to an understanding of aspects of the present technology, and therefore are not discussed further herein.

The one or more non-volatile memory circuitry 240 of the one or more processors 210 can be dense storage configured to store weights, kernel functions or the like. For example, the one or more non-volatile memory circuitry 240 can store weights such as, but not limited to, artificial intelligence (AI) weights, machine learning (ML) weights, and neural network (NN) weights. The weights can be read across the one or more communication channels 250 from the one or more non-volatile memory circuitry 240. Generally, the weights are written to the one or more non-volatile memory circuitry 240 once for use in a compute model, compute graph or the like. For ease of discussion, compute models, compute graphs and the like will generally be referred to as compute models. A compute model can be, but not limited to, an artificial intelligence (AI) model, a machine learning (ML) model, and a neural network model. The weights can be read over and over from the one or more non-volatile memory circuitry 240 for use by the one or more compute circuitry 230 in the compute model. Overwriting the weights is generally not necessary for a given compute model and therefore overwriting the weights in the one or more non-volatile memory circuitry 240 is avoided.

In additional, non-volatile memory circuitry 240 such as resistive random access memory (ReRAM), magnetic random access memory (MRAM), Flash memory (FLASH), or phase change random access memory (PCRAM) can be denser than conventional volatile memory circuitry 140 of the conventional processors 110, such as static random access memory (SRAM). The non-volatile memory circuitry 240 such as resistive random-access memory (ReRAM), magnetic random-access memory (MRAM), Flash memory (FLASH), or phase change random access memory (PCRAM) can consume less standby power as compared to static random-access memory (SRAM). Because overwriting the weights in the one or more non-volatile memory circuitry 240 is not needed for executing a given compute model, the access latency, power consumption, wear-out and other such parameter penalties generally associated with non-volatile memory circuitry 240 can be reduced.

Again, the weights can be read in from the off-chip memory 220 once and stored in the one or more non-volatile memory circuitry 240. The weights stored in the one or more non-volatile memory circuitry 240 can be used as operands of computations performed by the compute circuitry 230. In addition, results of one or more computations performed by one or more of the compute circuitry 230 can be passed as operands to one or more other of the compute circuitry 230 to perform one or more other computations, without the results being written back to the one or more non-volatile memory circuitry 240 before being read as the operands for the one or more other computations performed by the one or more other compute circuitry. For example, one or more weights in the non-volatile memory circuitry 240 can be used by a first compute circuitry 230 as an operand of a computation performed by the first compute circuitry 230. The result of the computation is passed from the compute circuitry 230 to another compute circuitry 230, instead of being written back to the non-volatile memory circuitry 240.

In contrast, in the processor 110 according to the conventional art, data is read in from the off-chip memory 120 to the on-chip volatile memory circuitry 140, the compute circuitry 130 performs a given computation on the data, and the result is written back to the on-chip volatile memory circuitry 140. Substituting the volatile memory circuitry 140 for the non-volatile memory circuitry 240 in the conventional processor is not practical when the results are written back to the non-volatile memory circuitry 240. For example, the non-volatile memory circuitry suffers from wear-out as compared to the volatile memory circuitry 140, that would not work with writing the results from computations back to the non-volatile memory circuitry from the compute circuitry 130. In addition, writing to non-volatile memory circuitry takes much longer than writing back to the volatile memory circuitry 140, which would increase latency when writing the results from computations back to the non-volatile memory circuitry from the compute circuitry 130.

However, by limiting the writing of weights to an initial write, reusing the weights, and passing computation results between compute circuitry, instead of writing back to memory, non-volatile memory circuitry 240 can advantageously be used for on-chip memory of a processor 210. The non-volatile memory circuitry 240 can have sufficient density to store all the weights needed for a most compute models. By writing the weights in an initial write, the non-volatile memory circuitry 240 can also advantageously reduce reading data out to the off-chip memory 220. Reducing the reading data out to the off-chip memory 220 can reduce bandwidth utilization of the communication interfaces 260 and reduce power consumption by the off-chip memory 220 in the compute system 200.

Figure 3:
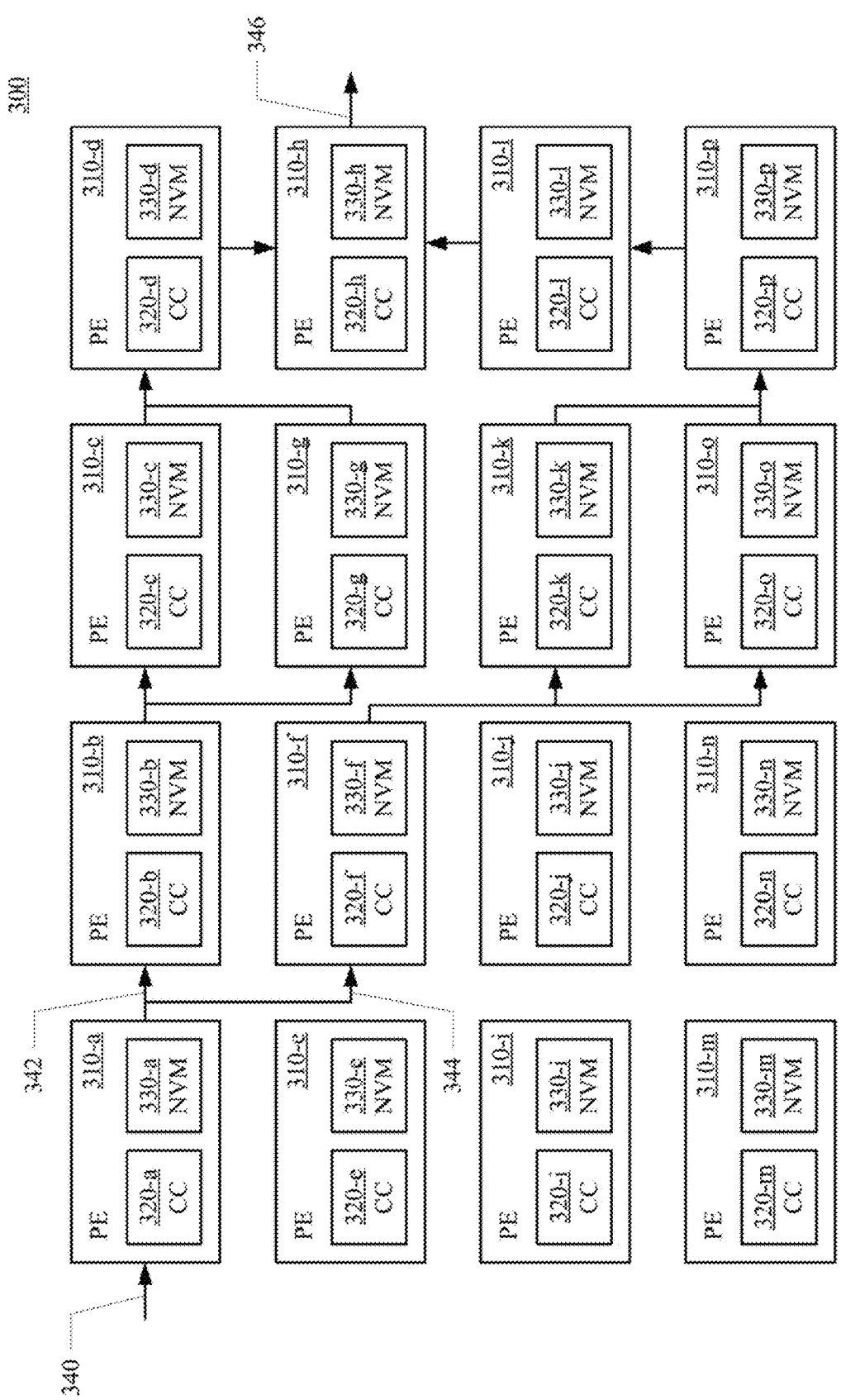
FIG. 3 shows a processor and exemplary configuration thereof, in accordance with aspects of the present technology.

Referring now to FIG. 3, a processor, in accordance with aspects of the present technology. The processor 300 can include a plurality of processing elements 310. Each processing element can include a compute circuitry 320 and a non-volatile memory circuitry 330. The non-volatile memory circuitry 330 can include, but is not limited to, one or more of a resistive random-access memory (ReRAM), magnetic random-access memory (MRAM), Flash memory (FLASH), or phase change random access memory (PCRAM). The non-volatile memory circuitry 330 can be dense storage configured to store weights, kernel functions or the like. For example, weights can include, but are not limited to, artificial intelligence (AI) weights, machine learning (ML) weights, and neural network (NN) weights. In one implementation, the plurality of processing elements 310 can be arranged in one or more sets of arrays including processing elements 310 arranged in one or more columns and one or more rows. Although the exemplary processor 300 is illustrated as including sixteen processing elements 310, the processor 300 can include any number of processing elements 310.

Figure 4:
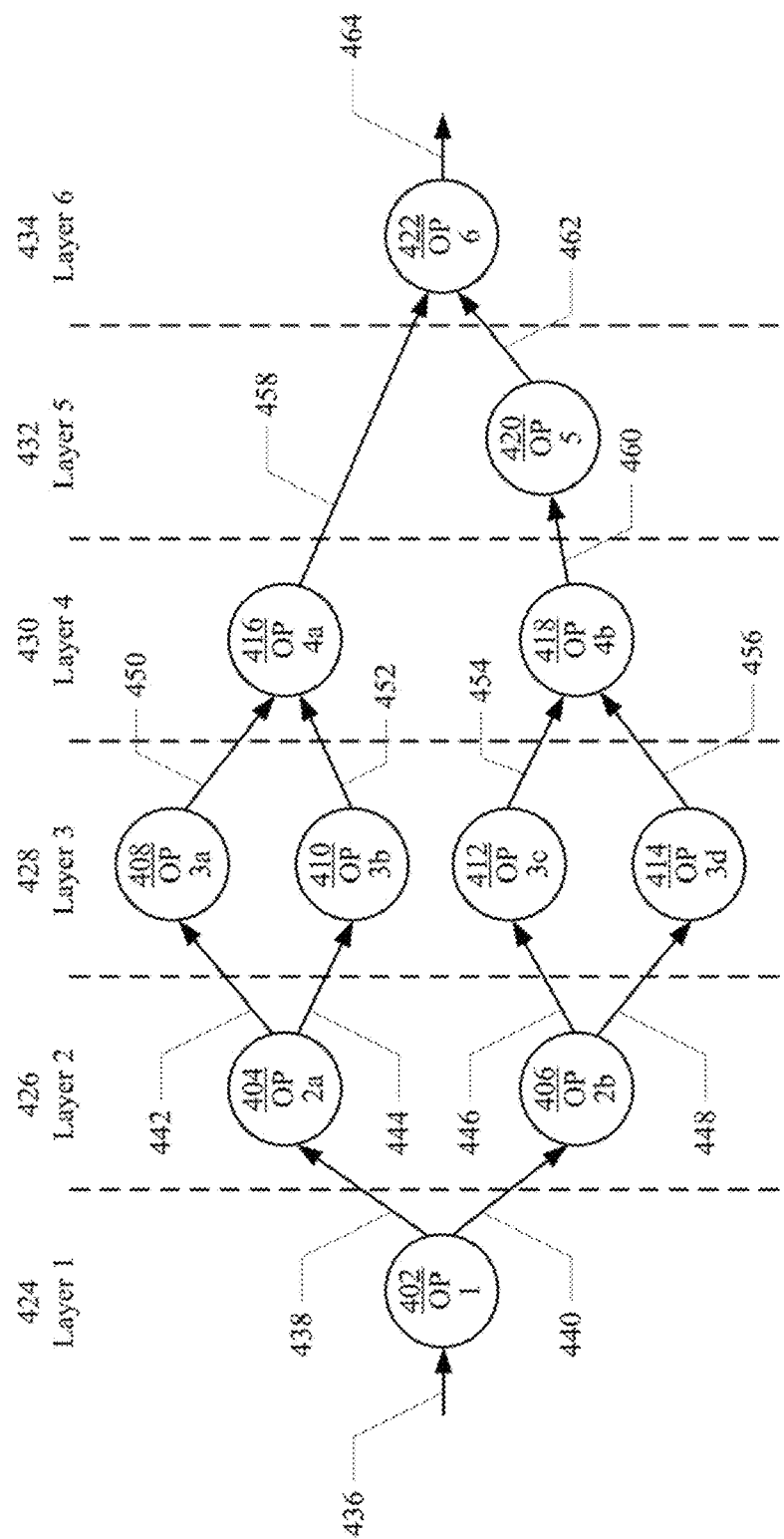
FIG. 4 shows an exemplary compute model, in accordance with aspects of the present technology.

The configuration and operation of the processor will be further explained with reference to FIG. 4, which shows an exemplary compute model, in accordance with aspects of the present technology. The exemplary compute model is merely for illustrative purposes and does not necessarily represent a specific compute model, and is not intended to limit any aspect of any compute model. The exemplary compute model 400 can include a plurality of nodes 402-422 arranged in a plurality of layers 424-434, with various nodes 402-422 coupled together by various edges 436-464.

Data flow between the plurality of processing elements 310 can be configured based on the edges 436-464 between nodes 402-422 of the compute model 400. In one implementation, inputs 340 of one or more processing elements 310 can be configured to receive respective inputs of the compute model 400. Data flow between one or more processing elements 310 can be configured to pass data between respective compute circuitry 320 based on respective edges of the compute model 400. Output 346 of one or more processing elements 310 can be configured to output respective network outputs 464 of the compute model 400. For example, data flow 340 into a first processing elements 310-*a* in a first row and a first column can be configured based on an input edge 436 into a first node 402 in a first layer 424 of the compute model 400. Data flow 342 between an output of the first processing elements 310-*a* and an input of a second processing element 310-*b* in the first row and a second column can be configured based on a respective edge 438 between the first node 402 and the second node 404 of the compute model 400. Data flow 344 between an output of the first processing element 310-*a* and an input of the third processing element 310-*f* in a second row and the second column can be configured based on a respective edge 440 between the first node 402 and a third node 406 of the compute model 400. The data flow configuration can similarly proceed for each edge of the compute model 400 through configuring an output data flow 346 out from a processing element in the second row and a fourth column based on an output edge 464 of the model 400.

The non-volatile memory circuitry 330 of respective processor element 310 can be configured based on the plurality of nodes of the compute model 400. In one implementation respective weights for respective nodes can be loaded into respective non-volatile memory circuitry 330. For example, weights for the first node 402 of the compute model 400 can be loaded into the non-volatile memory circuitry 330-*a* of a processing element 310-*a*. Weights for the second node 404 can be loaded into the non-volatile memory circuitry 330-*b* of a processing element 310-*b*. The configuration can similarly proceed for each node of the compute model 400 through loading weights of a final node 422 into the non-volatile memory circuitry 330-*h*.

The plurality of processing elements 310 of the processor 300 can be configured based the plurality of nodes of the compute model 400. In one implementation, respective processing elements can be configured to perform compute operations of a respective nodes of the compute model 400. For example, a compute circuitry 320-*a* of a first processing element 310-*a* in a first row and a first column can be configured to perform a compute operation (OP 1) of the first node 402 in the first layer of the compute model 400. A compute circuitry 320-*b* in a first row and a second column can be configured to perform a compute operation (OP 2*a*) of the second node 404, and a third compute circuitry 320-*f* in a second row and a second column can be configured to perform a compute operation (OP 2*b*) of the third node 406. The configuration can similarly proceed for each node of the compute model 400 through configuring a compute circuitry 320-*h* in a second row and a fourth column configured to perform a compute operation (OP 6) of the eleventh node 422 of the compute model.

After configuring the computation function of the processing elements, the data flow between the processing elements and the weights of the processing elements, the model can be executed by the processor 300 in response to each received input to generate a result therefrom. In one implementation, a respective compute circuitry 320 can be configured to retrieve the weights from the corresponding non-volatile memory circuitry 330, apply the weights to the respective data flow inputs to the respective compute circuitry 320, sum the products and apply an activation function for the corresponding node to the sum, and to generate an output of the processing element 310 in accordance with a corresponding compute operation of the respective node.

Figure 5:
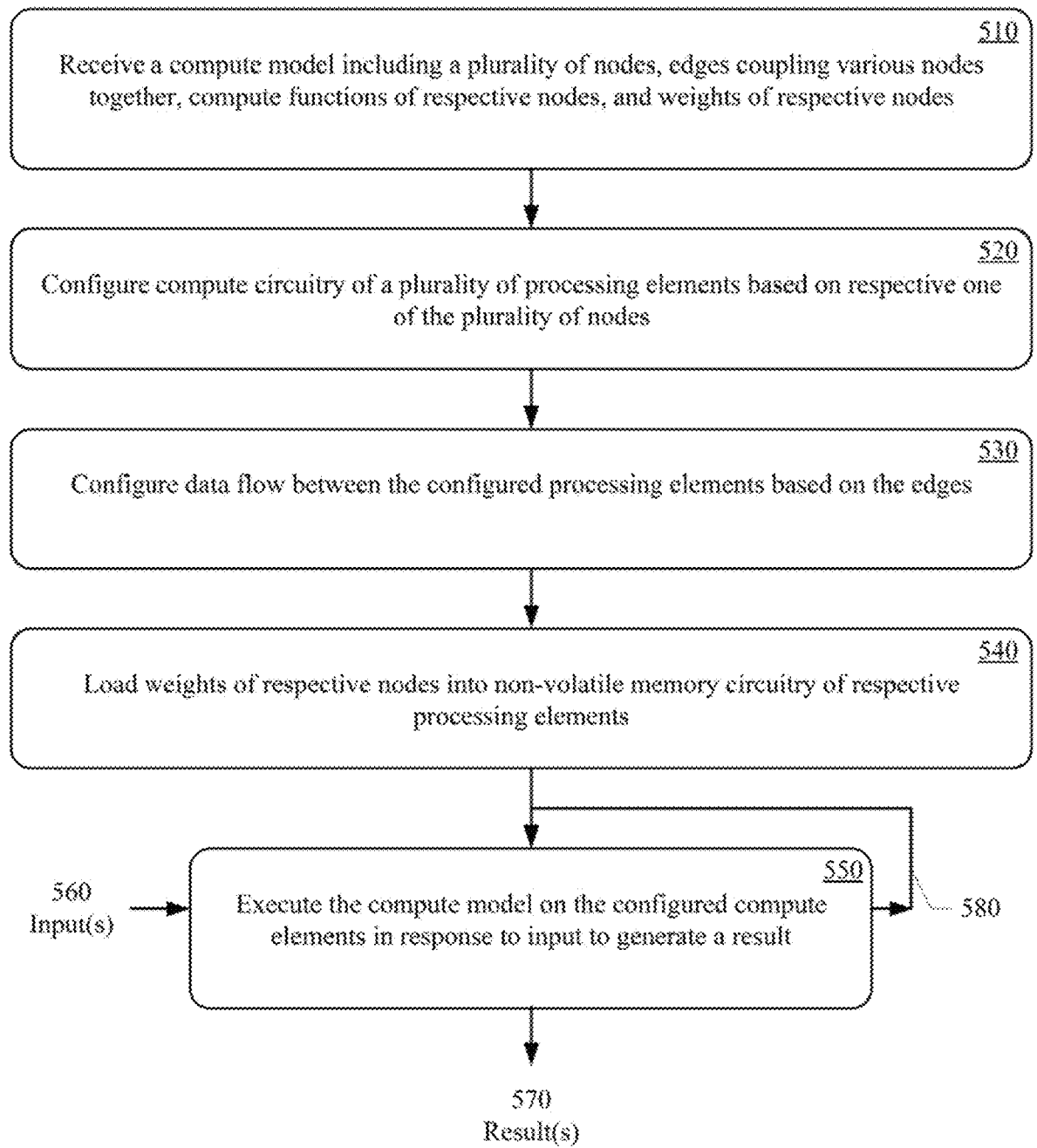
FIG. 5 shows a processor configuration method, in accordance with aspects of the present technology.

Referring now to FIG. 5, a processor configuration method, in accordance with aspects of the present technology. The method of configuring a processor can begin with receiving a compute model, at 510. The compute model can include a plurality nodes, edges coupling various nodes together, compute operations of respective nodes, and weights of respective nodes.

At 520, a plurality of processing circuitry of respective processing elements can be configured based on respective ones of the plurality of nodes of the compute model. In one implementation, respective processing circuitry can be configured to perform compute operations of respective nodes of the compute model.

At 530, data flow between the configured processing circuitry of respective processing elements can be configured based on the edges of the model. In one implementation, inputs of one or more processing circuitry can be configured to receive respective inputs of the compute model. Data flow between one or more processing circuitry can be configured to pass data between respective compute circuitry based on respective edges of the compute model. Output of one or more processing circuitry can be configured to output respective outputs of the compute model.

At 540, weights of respective nodes can be loaded into non-volatile memory circuitry of respective processing elements. In one implementation respective weights for respective nodes can be loaded into respective non-volatile memory circuitry. The configuration at 520-540 can be performed in any order, or even with two or more performed in parallel.

During a runtime execution, the compute model can be executed on the configured processing elements, at 550. In one implementation, the configured processing elements can generate results 570 in response to corresponding inputs 560. The compute model can be executed on the configured processing element any number of times 580 to generate corresponding results 570 for new inputs 560.

Figure 6:
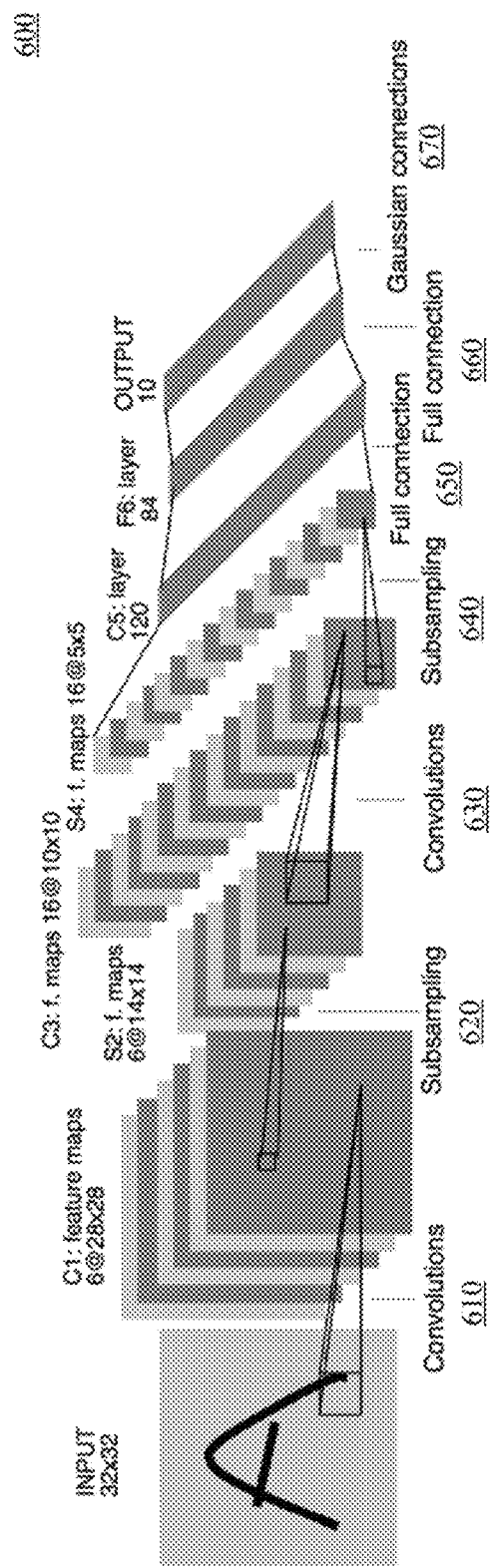
FIG. 6 shows an exemplary compute model, in accordance with aspects of the present technology.

Referring now to FIG. 6, an exemplary compute model, in accordance with aspects of the present technology, is shown. The compute model 600 can include a first convolution function of a first node 610, a first subsampling function of a second node 620, a second convolution function of a third node 630, a second subsampling function of a fourth node 640, a first full connection function of a fifth node 650, a second full connection function of a sixth node 660, and a Gaussian connection function of a seventh node 670. The first convolution function of the first node 610 can receive an input image. In one implementation, the input image can be a 32×32 bit pixel image frame. The first convolution function of the first node 610 can generate a plurality of feature maps. In one implementation, the plurality of feature maps can include six frames of 28×28 feature values. The plurality of feature maps can be input to the first subsampling function of the second node 620. The first subsampling function of the second node 620 can generate a subsampling of the input frames of feature values. In one implementation, the six frames of 28×28 feature values can be subsampled to generate six frames of 14×14 feature values. The plurality of subsampled feature maps can be input to a second convolution function of the third node 630. The second convolution function of the third node 630 can generate a plurality of feature maps. In one implementation, the six frames of 14×14 feature values can be convolved to generate sixteen frames of 10×10 feature values. The second subsampling function of the fourth node 640 can generate a plurality of subsampled feature maps. In one implementation, the sixteen frames of 10×10 feature values can be down sampled to generate sixteen frames of 5×5 feature values. The first full connection function of the fifth node 650 can generate a first layer. In one implementation, the first full connection function of the fifth node 650 can generate a 120 output layer. The second full connection function of the sixth node 660 can generate a second layer. In one implementation, a second full connection function of the sixth node 660 can generate an 84 output layer. The Gaussian connection function of the seventh node 670 can generate an output layer. In one implementation, the Gaussian connection function of the seventh node 670 can generate a 10 output layer. The exemplary compute model is merely for illustrative purposes and does not necessarily represent a specific compute model, and is not intended to limit any aspect of any compute model.

Figure 7:
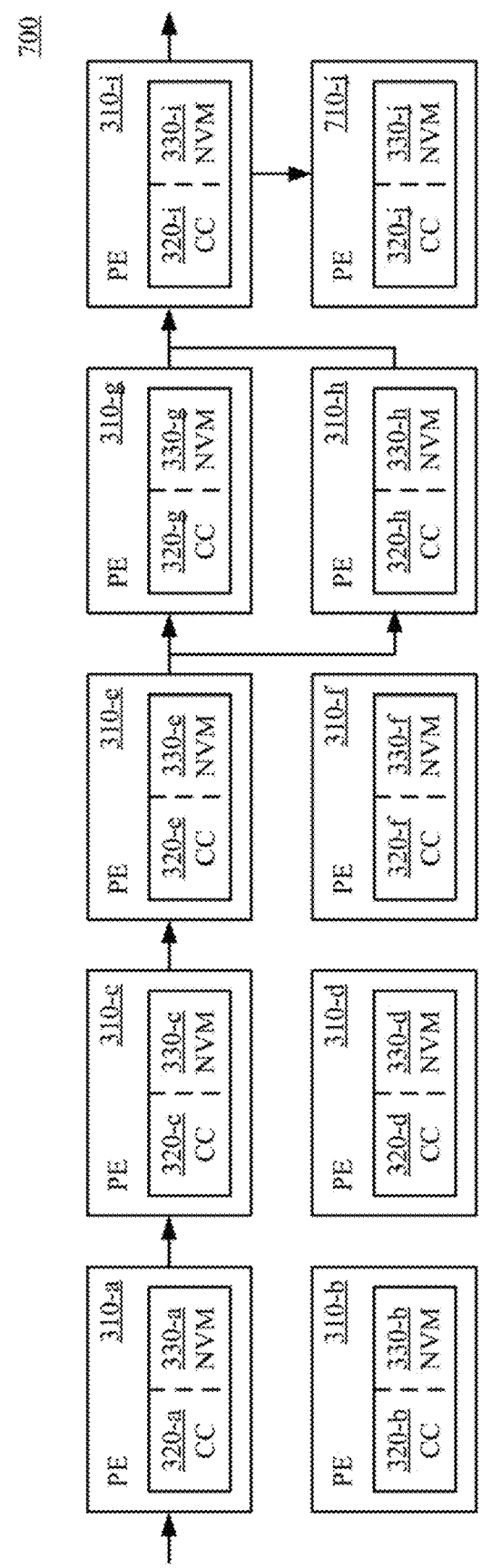
FIG. 7 shows a processor and exemplary configuration thereof, in accordance with aspects of the present technology.

Referring now to FIG. 7, a processor and exemplary configuration thereof, in accordance with aspects of the present technology, is shown. The processor 700 can include a plurality of processing elements 310. Each processing element 310 can include a compute circuitry 320 and a non-volatile memory circuitry 330. The non-volatile memory circuitry 330 can include, but is not limited to, one or more of as resistive random-access memory (ReRAM), magnetic random-access memory (MRAM), Flash memory (FLASH), or phase change random access memory (PCRAM). The non-volatile memory circuitry 330 can be dense storage configured to store weights, kernel functions or the like. For example, weights can include, but are not limited to, artificial intelligence (AI) weights, machine learning (ML) weights, and neural network (NN) weights.

The configuration and operation of the processor will be further explained with reference to the compute model described above with reference to FIG. 6. The compute circuitry 320 of a respective processing element 310 can be configured based on one or more of the plurality of nodes of the compute model 600. In addition, a plurality of compute circuitry 320 of respective processing elements 310 can be configured based on one of the plurality of nodes of the compute model 600. For example, a first compute circuitry 320-*a* can be configured to perform the first convolution function of the first node 610 and the first subsampling function of the second node 620. A second compute circuitry 320-*b* can be configured to perform the second convolution function of the third node 630 and the second subsampling function of the fourth node 640. A third compute circuitry 320-*e* can be configured to perform the first full connection function of the fifth node 650. A fourth compute circuitry 320-*g* and a fifth compute circuitry 320-*h* can be configured to share performance of the second full connection function of the sixth node 660. A sixth compute circuitry 320-*i* can be configured to perform the Gaussian connections function of the seventh node 670. The corresponding non-volatile memory circuitry 330-*a*, 330-*c*, 330-*e*, 330-*g*, 330-*h* and 330-*i* can be configured to store corresponding weights of corresponding nodes 610-670 of the compute model. In addition, the data flow between corresponding compute circuitry 310-*a*, 310-*c*, 310-*e*, 310-*g*, 310-*h* and 310-*i* can be configured based on the corresponding edges of the compute model. The data flow between compute circuitry 310 can be implemented by programmable interconnections, such as multiplexors/demultiplexers, by communication buses or the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A compute chip comprising:
    a plurality of compute circuitry of a monolithic integrated circuit, wherein the plurality of compute circuitry perform computation operations;
    one or more non-volatile memory circuits of the monolithic integrated circuit;
    one or more communication interfaces of the monolithic integrated circuit configured to communicatively couple one or more circuits of the monolithic integrated circuit to one or more circuits external to the monolithic integrated circuit; and
    one or more communication channels of the monolithic integrated circuit configurable to communicatively couple the plurality of compute circuitry, the one or more non-volatile memory circuits and the one or more communication interface together, wherein results of one or more computations performed by one or more of the compute circuitry is passed as operands to one or more other of the plurality of compute circuitry to perform one or more other computations without the results of the one or more computations being written to the one or more non-volatile memory circuits.

2. The compute chip of claim 1, wherein the one or more non-volatile memory circuits includes memory selected from the group consisting of resistive random-access memory (ROAM), magnetic random-access memory (MRAM), Flash memory (FLASH), and phase change random access memory (PCRAM).

3. The compute chip of claim 1, wherein the plurality of compute circuitry are configurable to perform computation operations of a compute model.

4. The compute chip of claim 3, wherein the one or more non-volatile memory circuitry are configurable to store respective set of weights or kernel functions for computation operations performed by the respective one or more compute circuitry based on the compute model.

5. The compute chip of claim 4, wherein respective ones of the plurality of processing elements includes a respective compute circuitry and a respective non-volatile memory circuitry.

6. The compute chip of claim 5, wherein the one or more communication channels are further configurable to communicatively couple the respective compute circuitry of the plurality of processing elements together in parallel and in series based on the compute model.

7. A processor comprising:
    a plurality of processing elements of a monolithic integrated circuit, wherein;
        each processing element includes a processing circuitry and a non-volatile memory circuitry;
        the compute circuitry of respective processing elements are configurable to perform a respective computation;
        the non-volatile memory circuitry of respective processing elements are configurable to store a respective set of weights or kernel functions; and
        the plurality of processing elements are configurable to pass data between processing elements, wherein results of one or more computations performed by one or more of the compute circuitry passes as operands to one or more other of the compute circuitry to perform one or more other computations without the results of the one or more computations being written to the one or more non-volatile memory circuits.

8. The processor of claim 7, wherein the plurality of processing elements include processors selected from the group consisting of central processing units (CPU), graphics processing units (GPU), tensor processing units (TPU), artificial intelligence (AI) accelerators, and memory processing units.

9. The processor of claim 7, wherein the non-volatile memory circuitry includes memory selected from the group consisting of resistive random-access memory (ReRAM), magnetic random-access memory (MRAM), Flash memory (FLASH), and phase change random access memory (PCRAM).

10. The processor of claim 7, wherein the compute circuitry of the plurality of processing elements are configurable to perform respective computation operations of a compute model.

11. The of claim 10, wherein the compute circuitry of the plurality of processing elements are configurable to pass the data between processing elements based on computation operations of the compute model.

12. The processor of claim 11, wherein the non-volatile memory circuitry of the plurality of processing elements are configurable to store the respective set of weights or kernel functions based of the compute model.

13. The processor of claim 12, further comprising:
    data links configurable to couple the plurality of processing elements based on edges of the compute model.

14. A processor configuration method comprising:
receiving a compute model including a plurality of nodes, edges coupling various ones of the plurality of nodes together, and weights of respective nodes;
configuring compute circuitry of a plurality of processing elements based on respective ones of the plurality of nodes;
configuring data flow between the configured processing elements based on the edges, wherein results of one or more computations performed by one or more of the compute circuitry is passed as operands to one or more other of the compute circuitry to perform one or more other computations without the results of the one or more computations being written to non-volatile memory circuitry; and
loading the weights of respective nodes into the non-volatile memory circuitry of respective processing elements.

15. The processor configuration method according to claim 14, further comprising:
executing the compute model on the configured compute elements in response to one or more inputs to generate one or more outputs.

16. The processor configuration method according to claim 14, wherein the processing elements include on-chip processors selected from the group consisting of central processing units (CPU), graphics processing units (GPU), tensor processing units (TPU), artificial intelligence (AI) accelerators, and memory processing units.

17. The processor configuration method according to claim 14, wherein the non-volatile memory circuitry includes on-chip memory selected from the group consisting of resistive random-access memory (ReRAM), magnetic random-access memory (MRAM), Flash memory (FLASH), and phase change random access memory (PCRAM).

18. The processor configuration method according to claim 15, further comprising reading in the one or more input from off-chip memory.

19. The processor configuration method according to claim 18, further comprising writing the one or more output to the off-chip memory.

20. The processor configuration method according to claim 14, wherein configuring the data flow between the configured processing elements based on the edges includes configuring data links between the plurality of processing elements based on the edges of the compute model.

* * * * *